United States Patent [19]
Busson et al.

[11] Patent Number: 5,853,682
[45] Date of Patent: Dec. 29, 1998

[54] PROCESS FOR CRACKING AMMONIA PRESENT IN A GAS CONTAINING HYDROGEN SULPHIDE

[75] Inventors: Christian Busson, Charbonniere; Thomas Nietsch, Lyons, both of France

[73] Assignee: Institut Francais du Petrole, France

[21] Appl. No.: 813,595

[22] Filed: Mar. 7, 1997

[30] Foreign Application Priority Data

Mar. 8, 1996 [FR] France .................................. 96 02909

[51] Int. Cl.⁶ .................................................. C01C 3/00
[52] U.S. Cl. ..................... 423/237; 423/351; 423/574.1; 423/658.2
[58] Field of Search .................... 423/237, 351, 423/574.1, 658.2

[56] References Cited

U.S. PATENT DOCUMENTS

| | | | |
|---|---|---|---|
| 1,988,781 | 1/1935 | Burke | 423/237 |
| 3,661,507 | 5/1972 | Breitbach et al. | 423/237 |
| 3,773,912 | 11/1973 | Spangler | 423/574 |
| 4,181,706 | 1/1980 | Choulat et al. | 423/237 |
| 4,273,748 | 6/1981 | Takahashi et al. | 423/230 |
| 4,374,105 | 2/1983 | Anderson et al. | 423/230 |
| 4,514,375 | 4/1985 | Laufhütte | 423/237 |
| 5,672,326 | 9/1997 | Minak et al. | 423/237 |

FOREIGN PATENT DOCUMENTS 32 09 858   9/1983   Germany .

*Primary Examiner*—Wayne Langel
*Attorney, Agent, or Firm*—Millen, White, Zelano, & Branigan, P.C.

[57] ABSTRACT

A process is described for the catalytic cracking of ammonia present in a fluid containing hydrogen sulphide, in which the fluid is introduced into a reactor comprising a suitable catalyst and a catalytic cracking effluent is recovered. The temperature in the reaction zone is 1000° C. to 1400° C. and a reactor for carrying out the process comprises at least one heating chamber (3, 4) and at least one catalysis chamber (11) in which the ammonia is cracked without cracking the hydrogen sulphide. In a further variation, the reactor comprises at least one catalyst in the spaces defined between the heating elements.

21 Claims, 2 Drawing Sheets

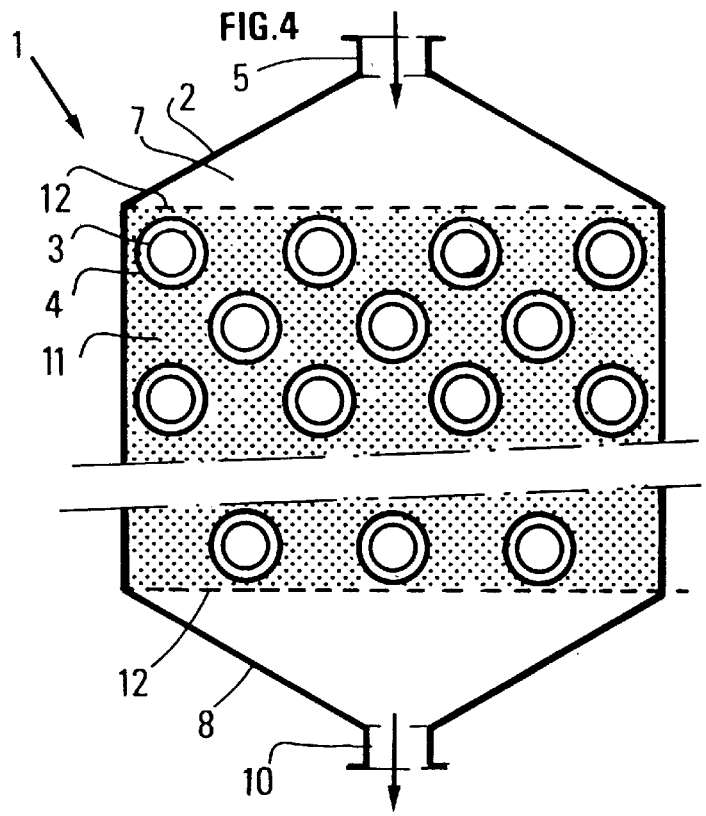
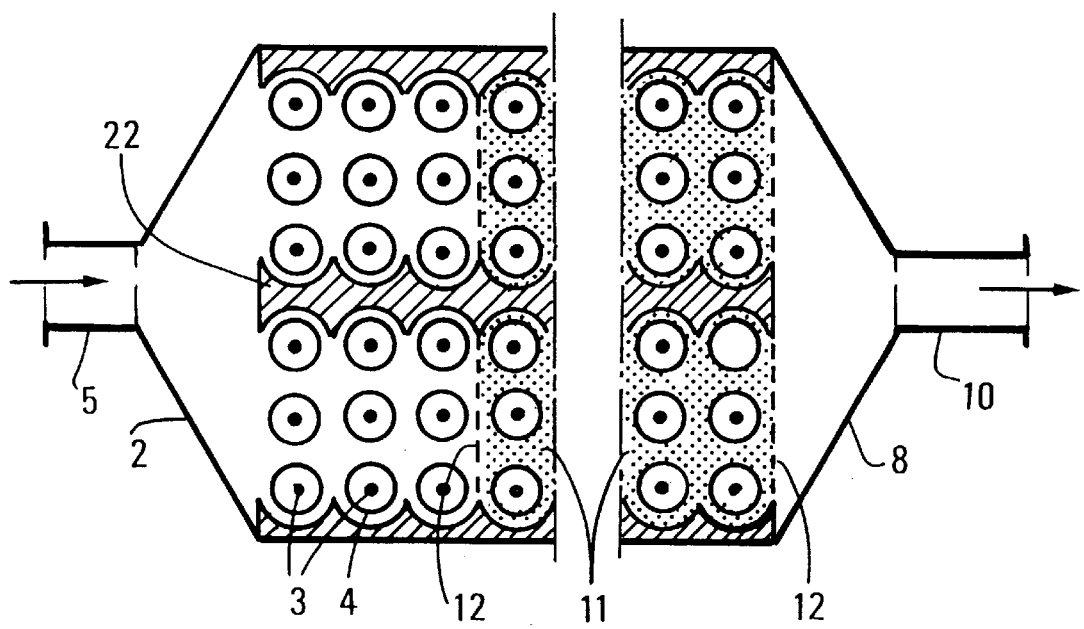

PROCESS FOR CRACKING AMMONIA PRESENT IN A GAS CONTAINING HYDROGEN SULPHIDE

FIELD OF THE INVENTION

The invention concerns a process and apparatus for catalytic cracking of ammonia contained in a gaseous or liquid fluid comprising hydrogen sulphide. It also concerns its use in a process or apparatus for the elimination of hydrogen sulphide.

BACKGROUND OF THE INVENTION

Oil is known to contain indole- or pyridine-type nitrogen-containing molecules. During hydrotreatment operations, the nitrogen contained in those molecules is transformed into ammonia ($NH_3$). This ammonia is eliminated by washing with water which, because of the presence of hydrogen sulphide ($H_2S$), produces an aqueous solution of ammonium sulphide. Until recently, the aqueous solution, after concentrating the $H_2S$ and $NH_3$ by steaming, was sent for incineration. This is no longer acceptable for environmental reasons ($SO_2$ pollution).

Refiners currently send this product to the thermal stage of a Claus plant. If the ammonia is not burned properly, as is often the case, solid salts such as ammonium sulphides or sulphites form and cause blockages in the coldest sections of the Claus plant, in particular in the sulphur condensers. In order to burn the ammonia properly, a homogeneous mixture of ammonia and air is required, along with a high flame temperature. However, the formation of oxides of nitrogen encourage the oxidation of sulphur dioxide ($SO_2$) to sulphur trioxide ($SO_3$). The Claus catalyst then becomes sulphided and the cold portions of the unit are seen to corrode.

The use of more complex combustion systems, such as a single burner which diverts a portion of the $H_2S$, or two burners, one for $H_2S$ and the other for the gas containing ammonia, have improved matters. Such innovations have the disadvantage of a high cost and greater difficulty in keeping the $H_2S/SO_2$ ratio to 2, which ratio is necessary for a high yield from the Claus plant.

Further, ammonia combustion has a direct effect on Claus plant conversion:

a dilution effect due to an increase in the quantity of air injected;

an unfavourable effect on thermodynamic equilibrium due to the production of steam.

Thus the presence of 18.7% by volume of ammonia in the feed ($H_2S$) to a Claus plant causes an increase of 53.7% in the discharged gas (mainly nitrogen) flow rate and an increase of 47.8% in the emission of sulphur-containing products compared to the operation of the plant in the presence of the same quantity of $H_2S$ but free of ammonia (B. G. Goar, Hydrocarbon Processing, July 1974, pp 129–132).

In order to overcome these disadvantages, a more interesting route has been studied, consisting of cracking the ammonia to nitrogen and hydrogen.

As an example, United States patents U.S. Pat. No. 4,273,748 and U.S. Pat. No. 4,273,749 describe the use of catalysts based on iron or nickel to decompose the ammonia from coal gasification. However, the hydrogen sulphide present poisons the catalyst. This means that two steps must be carried out:

in a first step, the gas is passed over a catalyst at a temperature of 450° C. to 700° C. to remove substantially all of the hydrogen sulphide; the sulphided catalyst must then be regenerated by oxidation;

in a second step, the purified gas is freed of substantially all of the ammonia by passage over a catalyst at a temperature which can reach 900° C.

U.S. Pat. No. 4,374,105 describes the use of zinc oxide to decompose ammonia in the presence of $H_2S$. This catalyst does not permit complete conversion of $NH_3$ and, further, it also requires an oxidation regeneration step.

Finally, German patent DE-A-320 9858 describes a process in which ammonia is catalytically dissociated in the presence of hydrogen sulphide using a nickel based catalyst at temperatures which are in the range 1000° C. to 1200° C.

In this patent, the high temperatures are achieved by reducing combustion of the gas to be treated with an addition of fuel gas. Mixing the gas to be treated, containing ammonia, with fuel gas and air then carrying out reducing combustion of the mixture has serious disadvantages from the point of view of treating the residual hydrogen sulphide downstream of the ammonia catalytic dissociation step:

the combustion of fuel gas produces large quantities of water, which means that not all of the gas leaving the ammonia dissociation reactor can be admitted as it is into the Claus plant. In the German patent, about two thirds of the gas must be cooled to allow the water to condense in the distribution column. Further, the water produced by condensation must contain certain impurities (traces of undissociated ammonia, traces of hydrogen sulphide, . . . ) rendering its discharge into the environment impossible without prior treatment;

combustion of fuel gas (generally constituted by methane and other light hydrocarbons) produces large quantities of carbon dioxide which reacts with the hydrogen sulphide to form carbonyl sulphide and carbon disulphide in large quantities depending on the conditions in the catalytic zone for ammonia dissociation (high temperature and partial pressure of hydrogen). It is also known that such products are particularly difficult to hydrolyse thereafter in the catalytic beds in the Claus plant;

finally, the presence of an oxidizer in the combustion step causes the presence of nitrogen which cannot be condensed and which helps to dilute the gas mixture.

SUMMARY OF THE INVENTION

One of the aims of the invention is to overcome the disadvantages of the prior art. A further aim is to discharge as small an amount of toxic pollutants as possible into the atmosphere. A further aim is to maintain the catalyst in a good, useful condition for as long as possible and to avoid regenerating it. A further aim concerns the use of catalytic thermal furnaces of ceramic material, specially adapted to catalytic cracking of the ammonia contained in a gas comprising hydrogen sulphide.

More precisely, the invention concerns a process for the catalytic cracking of ammonia present in a fluid containing hydrogen sulphide, in which the fluid is introduced into a reaction zone comprising a suitable catalyst and a catalytic cracking effluent is recovered. The temperature in said reaction zone is generally in the range 1000° C. to 1400° C. and is obtained by heating or heat exchange means contained inside the reaction zone.

Mixing the gas to be treated with a fluid providing the heat required for the dissociation reactions never occurs.

The process of the invention, where only the fluid is introduced into the reaction zone, requires simple equipment and means that all of the gas leaving the ammonia dissociation reactor can be directly sent to the Claus plant without diluting the gas, in contrast to that of patent DE-A-320 9858. This helps to improve the conversion yield.

Preferably, the temperature of the reaction zone is 1150° C. to 1250° C.

In a further feature, the pressure in the reaction zone is generally that of the fluid entering it and brought into contact with the catalyst.

That pressure is advantageously in the range 1.05 to 5 bars absolute.

In a further feature, the fluid is injected at a rate such that the residence time in the catalytic reaction zone is in the range 0.1 to 100 seconds, preferably in the range 0.5 to 10 seconds. The residence time becomes shorter as the final temperature increases.

Under these operating conditions, the degree of ammonia conversion is over 99.5% and remains over 99.5% for a very long period of time, for example at least 2000 hours.

The degree of hydrogen sulphide conversion generally is and remains below 10%, advantageously below 4% and preferably below 2%.

The feeds which are treated can be liquid or gaseous. They are generally aqueous, containing $NH_4OH$ and $H_2S$, or gaseous containing $H_2S$, $NH_3$ and possibly steam. These feeds can be at least one effluent selected from the group formed by overhead effluents from the steaming apparatus for refinery process water, coal gasification effluents and biogases.

Coke-oven plant effluents (coke-oven gas), which also contain hydrocyanic acid, can also be treated using the process and apparatus of the present invention. In the presence of steam, the hydrocyanic acid dissociates in known reactions to form nitrogen, hydrogen and carbon monoxide then carbon dioxide. The hydrogen obtained can contribute to improving the degree of conversion in the downstream Claus plant.

After eliminating the ammonia, the hydrogen sulphide can then be destroyed in conventional fashion. As an example, when treating an overhead effluent from a steaming apparatus for refinery process water, following cracking, the gas can be sent completely naturally to the thermal stage of a Claus plant. When no Claus plant is available, any process for purifying a gas containing $H_2S$ can be used, for example chemical absorption.

The catalyst used can be selected from the group formed by at least one noble metal from group VIII, at least one metal from group VIIB, at least one metal from group VIIB mixed with at least one metal from group VIII, at least one metal from group VIB, at least one non noble metal from group VIII mixed with at least one metal from group VIB and at least one non noble metal from group VIII with at least one noble metal from group VIII.

Preferably, cobalt or zinc is mixed with molybdenum or tungsten.

Of the group VIIB metals, rhenium alone or combined with noble metals from group VIII: Ru, Rh, Pd, Os, Ir, or Pt, is preferable, advantageously Re-Pt.

Other catalysts can be used, such as those described in European patent EP-A-0 027 069, hereby incorporated by reference, also containing cerium.

The catalyst can be in the form of the metal (W, Mo or Pt wire, for example), supported (alumina, silica, silica-aluminas, titanium oxide, zirconium oxide, cordierite), pelletized, or extruded (oxides or sulphides of Co-Mo, for example).

In a first embodiment, the reaction zone is normally a reactor containing a catalyst and which can reach very high temperatures, preferably a ceramic reactor, heated by heating or heat exchange means which are substantially perpendicular to the axis of the reactor, and thus to the direction of fluid flow. More precisely, the invention concerns a catalytic reactor which is elongate along one axis, comprising, at a first extremity, at least one means for supplying at least one feed, at least one means for evacuating the effluents produced at the other extremity, the reactor comprising heating means disposed in substantially parallel layers determining transverse sections which are substantially perpendicular to the reactor axis to define spaces or passages for circulation of the feed and/or effluents between said means and/or the layers formed by said means, the reactor being characterized in that, in a first embodiment, it comprises at least one elementary reaction zone ($Z_i$) containing, along the axis in the direction of flow of the feed and/or the effluents, a heating chamber containing said heating means, followed by a catalysis chamber containing at least one catalyst.

With the gas circulating alternately in a heating zone then in a catalytic zone, the ammonia can be dissociated quasi isothermally and thus the degree of conversion of ammonia is higher than with the adiabatic reactor described in German patent DE-A-320 9858.

The reactor may contain only one elementary reaction zone Z, comprising a heating chamber connected to the feed supply means and, downstream thereof, a catalysis chamber connected to the effluent evacuation means, particularly when the concentration of ammonia in the feed to be treated is very low.

In a further variation, the reactor comprises a plurality of elementary reaction zones $Z_i$, i advantageously being in the range 1 to 10, disposed in series along the axis, the catalytic chamber of upstream zone $Z_{i-1}$ being adjacent the heating chamber of this downstream zone $Z_i$. The temperature in the heating chamber in zone $Z_i$ is advantageously higher than that in upstream zone $Z_{i-1}$ which in turn is higher than that in zone $Z_{i-2}$ further upstream, and so on.

Catalyst can also be introduced into at least a portion of the spaces defined between the heating means of the heating chamber, preferably into those with a temperature of at least 600° C.

The length of the zones and their number depends on the concentration of ammonia in the feed and the selected degree of conversion.

In a second embodiment of the apparatus, the catalytic reactor comprises heating means disposed in substantially parallel layers determining transverse sections which are substantially perpendicular to the reactor axis, to define spaces or passages for the circulation of the feed or effluents between said means and/or layers formed by said means. These spaces are filled by at least one catalyst.

In these two embodiments of the apparatus, each transverse heating section can comprise at least one heating or heat exchange means.

They can be filled with catalyst along the entire length of the reactor but, since there is no conversion at low temperatures, it is advantageous that only the spaces which are in a temperature range of at least 600° C. contain catalyst. Preferably, spaces with a temperature of more than 900° C. are filled with catalyst. This results in substantial savings.

In a second embodiment there is no adiabatic catalysis zone, in contrast to the first embodiment. The temperature profile is increasing, with or without a plateau.

It may be advantageous to place at least one wall of refractory material substantially parallel to the reactor axis to divide the stream. The wall then contributes to radiative exchange.

In this way, at least two substantially parallel channels are defined in which the elementary reaction zones or the heating means are disposed when the space between these heating means contains the catalyst.

In the spaces or passages, the heating means generally constitute independent successive transverse layers which are substantially perpendicular to the reactor axis. In one feature of the reactor, the heating means comprises sleeves in which electrical resistors are located. This construction is described, for example, in French patent FR-A-2 662 158, which is hereby incorporated by reference. In that patent, a gas containing hydrogen, nitrogen, steam or a mixture of these substances can circulate in the internal space between the sleeves and the electrical resistors, at a pressure which is generally higher than the pressure of the reaction gas in the reactor.

In a further variation, the heating means are at least one heat exchange means comprising a tube, formed by at least one envelope, connected to a means for supplying a heat exchange gas or gas mixture adapted to exchange heat with the reactant/reactants (effluents) circulating outside the heat exchange means. This latter generally comprises at least one outlet for evacuating the gas or gas mixture which has exchanged heat with the effluent(s) to the outside of the reactor. This heat exchange means advantageously communicates with a gas burner connected to means for supplying a fuel gas and an oxidizer gas, as described in patents FR-A-2 616 518, FR-A-2 616 520 and FR-A-2 715 583, hereby incorporated by reference.

Means for controlling and modifying the electrical or hot gas heating is generally connected to the heating chamber in each elementary zone, more generally to each transverse heating section, the spaces for fluid circulation of which contain catalyst.

In one feature of the invention, the heating chambers are independently supplied with electrical energy or hot gas, either in isolation, or in transverse rows, or in small groups, to defined heating sections along the heating chambers and thus to enable the quantity of energy supplied along the entire length of the zone to be modified.

Modification of these heating sections can be carried out conventionally: the heating elements, in the case of electrical heating, corresponding to the above sections, are generally supplied via thyristor modulator assemblies. Transformers can optionally modify the voltages in the first instance, while modulators can be used for fine, continuous regulation of the power which is applied.

In order to enable regulation of the assembly, each heating section can be provided with an insertion pyrometer with a thermocouple which is suitable for the temperature; these pyrometers are disposed in the spaces in which the feed circulates, and data is transmitted to the regulator which controls the thyristor modulator in the case of electrical heating.

The temperature profile in each heating zone is generally increasing while the catalytic zone is substantially adiabatic. When the spaces between the heating sections contain catalyst, the temperature profile can be increasing with or without a plateau and there is no adiabatic zone.

The electrical energy supplied to the first heating zone is such that it generates a steep temperature gradient to produce a relatively high average feed temperature in the heating chamber under consideration, which favours the conversion reaction.

The invention also concerns the use of a catalytic reactor in accordance with the invention, in an integrated process for the elimination of hydrogen sulphide and ammonia contained in a gas, the latter possibly containing hydrocyanic acid.

A Claus type plant is known for the elimination of sulphur, comprising a burner (B) receiving a feed containing hydrogen sulphide and air and located at the inlet to the Claus plant combustion chamber (CC). Downstream of the chamber is a boiler (Ch) for recovery of the energy accumulated by the combustion. Effluents from the boiler are cooled in a sulphur condenser Ci and sulphur is recovered. The gaseous effluents from the condenser are introduced into at least one apparatus (Di) comprising a heater (Ri) for the effluent followed by a Claus catalytic bed (CRi), in turn followed by a sulphur condenser (CI) which recovers solid sulphur from the effluent which is freed of sulphur. This latter effluent can then be sent to a TGT unit for treatment of the Claus tail gas.

In accordance with the invention, the gas to be treated containing $H_2S$, $NH_3$ and $H_2O$, possibly freed of the water it contains in a stripper S and preheated by steam, is introduced into the catalytic cracking (dissociation) reactor (F) of the invention.

The gaseous effluent from cracking, substantially free of ammonia and at a very high temperature, can be at least partially introduced:

1. either to the Claus plant burner (B) supply. This solution limits any addition of fuel gas by recovering the heat delivered by reactor F at the boiler (Ch);
2. or to the outlet from the Claus plant combustion chamber CC. This solution can recover the heat delivered by reactor F at the boiler Ch and, in particular, prevents combustion of the hydrogen produced by dissociation of ammonia and thus limits dilution of the gas supplying the Claus catalytic beds (CRi), improving the yield of sulphur from these beds;
3. or to the heaters (Ri) of apparatus (Di), to the inlet to catalytic beds (CRi). This solution reduces the operating costs of the Claus plant and simplifies the design (the heater can be replaced by simply mixing the hot gases). As in the preceding case, it can avoid combustion of the hydrogen produced by the ammonia dissociation.

Once cooled, the hot effluent from dissociation reactor F can also be introduced to the inlet to the Claus tail gas treatment unit (TGT).

When the TGT is a process which incorporates a hydrogenation step (the SCOT process, for example), this solution, as well as solutions 2 and 3, simplifies this step and reduces the consumption of fuel gas necessary for the production of hydrogen, as this is produced by the dissociation of ammonia. They are possible because hydrocarbons, generally present in trace amounts (−1% by volume), have been transformed to $H_2$, CO, $CO_2$ in the catalytic dissociation furnace F.

BRIEF DESCRIPTION OF DRAWINGS

The invention will be better understood from the accompanying figures which schematically illustrate the process and apparatus, in which:

FIGS. 4 and 5 show a further embodiment of an apparatus in which the spaces between the transverse heating elements contain catalyst.

Figure 1:
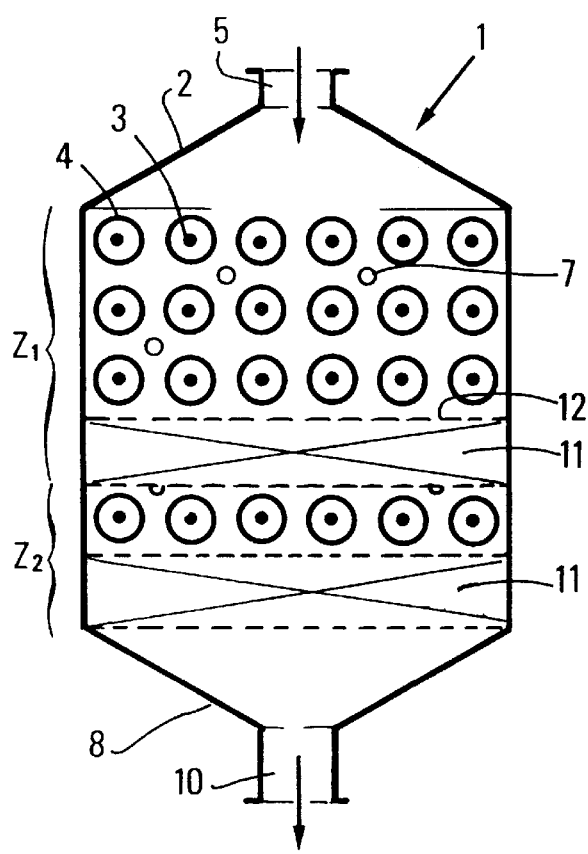
FIGS. 1 and 2 show a longitudinal section through a reactor along the sleeve axis.

In the embodiment of FIG. 1, a vertical reactor (1) of ceramic material, elongate and with a rectangular cross section, comprises a distributor (2) for supplying the reactor with a reaction gas mixture via an inlet orifice (5). This mixture, which contains a mixture of steam, $SO_2$ and $NH_3$, has been preheated in a conventional preheating zone, not shown in the Figure, preferably by convection. The reactor comprises two elementary reaction zones $Z_1$ and $Z_2$, in series, each comprising a heating chamber and a catalytic chamber, with a length which can vary from one elementary reaction zone to another. Each heating chamber in the reactor comprises a plurality of electrical heating means (3) surrounded by sleeves (4) disposed in parallel layers and forming an array with a square mesh in one plane (the plane of the figure). These layers define transverse heating sections which are substantially perpendicular to the reactor axis defined in the direction of flow of the feed, each of the transverse heating sections comprising at least one heating means.

These heating sections are independently supplied with electrical energy by means of a pair of electrodes (not shown); pyrometric thermocouple sensors (7) lodged in the spaces in which the feed circulates between the sleeves (4) allow the temperature in each heating section to be automatically regulated using a conventional regulation and modification apparatus which is not shown in the figure. In the first heating chamber, the sleeves are heated such that the temperature of the feed increases rapidly from 150°–300° C. (preheating temperature) to about 1100° C.

In one plane (the plane of the figure), the parallel layers form an array with a square mesh, as shown in FIG. 1. FIG. 1 shows 6 parallel heating layers which define 4 transverse heating zones. These numbers can be varied depending on the concentration, and particularly on the flow rates, of the gas to be treated.

Following the first heating chamber of the first elementary reaction zone which can heat the feed to a temperature of up to 1110° C., for example, a first catalytic chamber (11) is disposed which contains, for example, a catalyst in the form of a honeycomb as described in EP-A-0 027 069, between two screens (12) pierced with orifices via which the feed, heated to 1110° C., is introduced into the catalytic zone.

The temperature drops to about 1000° C. after passing through the first catalysis chamber. A second heating chamber, corresponding to the second elementary reaction zone $Z_2$ adjacent the first catalysis chamber, heats the effluent to a temperature of about 1250° C. This temperature drops to about 1200° C. at the outlet from the second catalysis chamber.

The effluent which is recovered, containing substantially no ammonia, is collected in the lower portion (8) of reactor (1) and evacuated via an outlet orifice (10). It essentially contains hydrogen sulphide, hydrogen and nitrogen.

Figure 2:
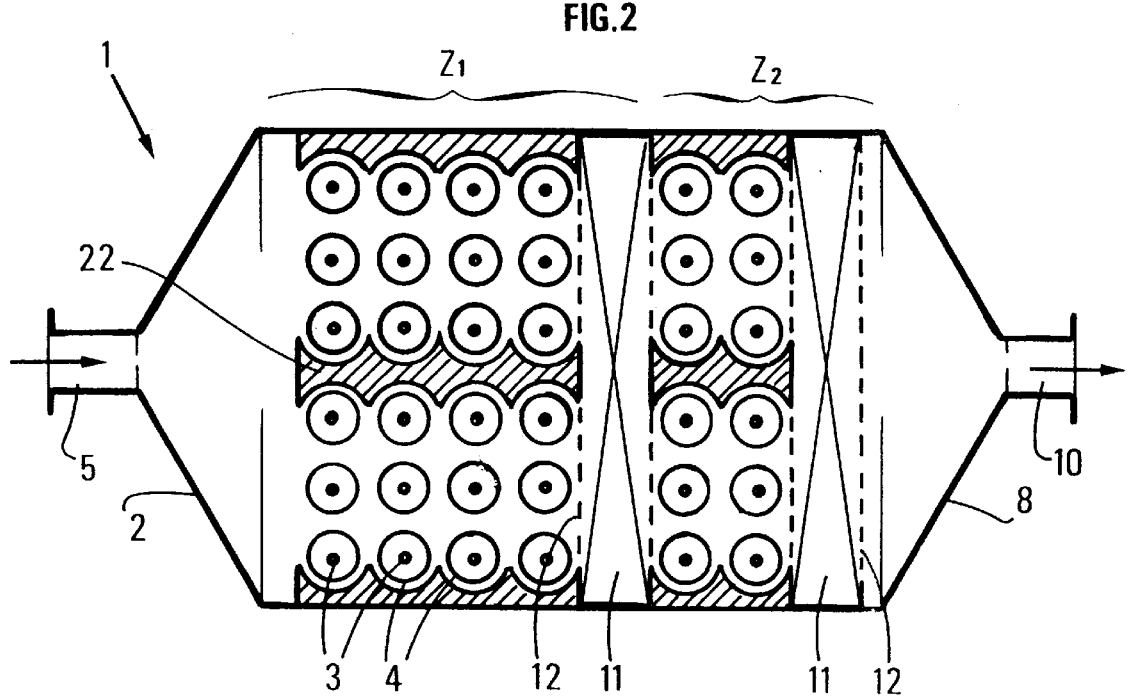

FIG. 2 shows a further embodiment of an elongate reactor (1) with a rectangular cross section using the same reference numerals as in FIG. 1. It comprises sleeves (4) disposed in parallel layers defining transverse sections perpendicular to the reactor axis and forming an array with a square mesh in one plane (the plane of the figure). Several layers are separated by a wall (22) of ceramic material, substantially parallel to the axis, in this case defining two channels. These walls have a form which can create turbulence, comprising cells at the level of each sleeve (4). The reactor walls can also comprise cells as indicated in the figure.

Figure 3:
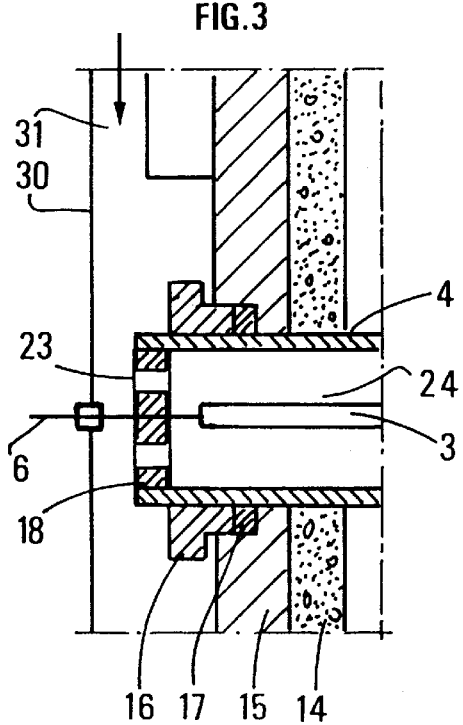
FIG. 3 shows a detail of an embodiment of the heating chamber which is also supplied with a sleeve gas.

FIG. 3 shows the same elements for the reactor as those described for FIGS. 1 or 2; FIG. 3 shows a protective casing (30) comprising an orifice (31) at one extremity via which gas G is introduced, containing nitrogen, for example. A further orifice provided with a valve (not shown) at the other extremity regulates the flow of this gas G. The casing (30) is fixed to the metal armature of reactor (1) and surrounds the assembly of electrical resistors and sleeves containing them, with the exception of the extremity of the electrical resistors via which the electrical energy is supplied. Rod resistors (3) are positioned in sleeves (4) with the help of spacers (18), of ceramic fibre, for example, comprising passages (23) allowing gas G, for example nitrogen, to penetrate into space (24) between the resistors and the sleeves.

Gas G is circulated by means of a slight overpressure with respect to the pressure of the reaction gas in the reactor, thus ensuring a perfectly controlled atmosphere and better diffusion of gas G towards the space in which the reaction gases are circulating.

The absolute pressure difference, or overpressure, between the resistor space and the reaction gas circulation space is preferably such that the pressure in the resistor space is more than at least 0.1% and usually by at least 1% of the pressure in the reaction space. It is not necessary to have a very large overpressure and usually, the pressure in the resistor space remains less than twice the pressure in the reaction gas circulation space.

FIG. 3 also shows a detail of an embodiment of the heating zone of the invention. The electrical heating means is constituted by resistors (3) which are cylindrical in form. These resistors each have cold zones at one extremity and a portion of the central zone which is the hot zone representing, for example, about 68% of the total length.

The reactor has a rectangular cross section, the walls being constituted by insulating refractory concrete (14) and by a metal armature (15). A circular hole is pierced in two laterally opposed walls, in which a sleeve (4) is passed, of ceramic material for example, with a diameter which is double that of the electrical resistor (3). Sleeve (4) is positioned by means of a rod packing system (16) acting in a neck at the metal armature on a packing of refractory material (17), for example a ceramic material packing. The resistor (3) is positioned in sleeve (4) with the help of spacers (18), of ceramic fibre for example, comprising orifices (23) allowing gas G containing nitrogen, for example, to pass, introduced into casing (30) via conduit (31) into the resistor space (24).

The hot zone of resistor (3) supplied by a pair of electrodes (6), the extremities of which leave casing (30), is positioned so that it does not penetrate into the orifice passing through the insulating concrete wall. It is not essential to use a packing (17) at the rod packing since in this invention, this acts as a positioning means and does not have as its main aim the provision of as perfect a seal as possible between the interior and exterior of the reactor. The rod packing can advantageously be replaced by a simpler sleeve positioning means such as, for example, simple spacers of refractory material.

A certain number of sleeved heating resistors are therefore provided in walls, of ceramic material for example, in successive horizontal rows, these rows preferably being aligned such that they form an array with a square or rectangular mesh on the lateral walls of the furnace. Casing (30), through which only the extremities of the resistors and/or their electrical supply (6) pass, has the stream of gas G running through it, gas G containing nitrogen, for example, which thus circulates inside the sleeves.

In FIG. 4, corresponding to the second embodiment of the apparatus, the reactor comprises the same heating means, with the same reference numerals as those of FIG. 1, the difference being that all the spaces between the various sleeves through which the feed and effluents flow contain at least one catalyst supported by screens 12.

FIG. 5 shows the same heating means as in FIG. 2, dividing the stream by a wall 22. In contrast, the catalyst is disposed in the spaces between heating sleeves 4, and supported by screens 12. Only the portion of the heating zone which is, for example, at a temperature of more than 600° C., contains catalyst with a temperature profile which increases from top to bottom.

The following examples illustrate the invention.

EXAMPLE 1

A horizontal reactor with a rectangular cross section was used which had the following internal dimensions: 0.5 m×1 m, with a length of 4.3 meters. The heating means in this reactor were constituted by electric rod resistors of molybdenum disilicide ($MoSi_2$); these resistors were surrounded by ceramic sleeves, disposed concentrically with respect to the centre of the circle surrounding the resistors.

The sleeves were of silicon carbide. Each sleeve, which was closed at one extremity, surrounded two rod resistors. These substantially parallel sleeves were located perpendicular to the direction of circulation of the feed. The length of each branch of the electrical resistor rod was 90 cm and the resistor diameter was 9 mm. The ceramic sleeves were 100 cm long, with an external diameter of 32 cm and an internal diameter of 30 cm.

The reactor comprised three elementary reaction zones:
the first heating zone comprised four transverse sections, independently regulated, each comprising a heating sleeve containing nitrogen as the sleeve gas. Each heating chamber was 1.8 m long. The temperature rose to 1100° C.;
the first catalysis chamber, 0.3 m long, contained a catalyst prepared as described in European patent EP-A-0 027 069 (Example 2), with the following composition by weight: platinum: 0.09%; rhodium: 0.009%; iron: 1%; and cerium: 3.5% The temperature of the effluent therefrom was 1000° C.
the second heating chamber contained only one heating sleeve and was 0.6 m long. The temperature rose to 1180° C.;
the second catalysis chamber contained the same catalyst and was 0.3 m long. The temperature of the effluent therefrom was 1100° C.;
the third heating chamber contained only one heating sleeve and was 0.6 m long. The temperature rose to 1240° C.;
the third catalysis chamber contained the same catalyst and was 0.7 m long. The temperature of the effluent therefrom was 1200° C.

The total length of the catalysis chambers was 1.3 m.

The residence time was determined from the total volume of the catalysis chambers.

A feed comprising 56.4% by weight of hydrogen sulphide, 18.2% by weight of ammonia and 25.4% by weight of water was introduced at a rate of 241 kg/h so that the residence time at the operating temperature and pressure of 0.11 MPa was 2 seconds.

The results of catalytic cracking of ammonia at 1200° C. in accordance with the invention and at 900° C. by way of comparison are shown in the Table below.

| | T 1200° C. | | T 900° C. | |
|---|---|---|---|---|
| Time | $NH_3$ % cracking | $H_2S$ % cracking | $NH_3$ % cracking | $H_2S$ % cracking |
| 10 min | 99.65 | 1% | 99.5 | 1% |
| 90 min | 99.65 | 1% | 50 | 1% |
| 5 hours | 99.65 | 1% | 0 | 1% |
| 2000 hours | 99.65 | 1% | | |

A comparison of the results shows that the catalyst continued to function entirely normally. It was thus not necessary to regenerate it.

EXAMPLE 2

The reactor had an internal dimension of 1.2 m×1 m and length of 3.5 m and comprised the same sleeves as those of Example 1, but were disposed in two rows between the walls.

The reactor comprised two zones:
the first zone was a preheating chamber comprising six heating sleeves, regulated two by two, each heating sleeve containing nitrogen as the sleeve gas. The heating chamber was 1.5 m long. The temperature rose to 950° C.;
the second zone was 2 m long, delimited by two screens and comprised six heating sleeves regulated two by two. Across the width, the distance between sleeves and between the sleeve and the wall was 18.7 cm and along the length, the distance between sleeves and between sleeve and screen was 26 cm. These distances were selected so that the residence time at the temperature and operating pressure of 0.11 MPa was 2 seconds. Before putting on the reactor roof, a catalyst based on cobalt and molybdenum was poured between the screens to fill the empty spaces.

A feed comprising 56.4% by weight of hydrogen sulphide, 18.2% by weight of ammonia and 25.4% by weight of water was introduced at a rate of 482 kg/h so that the residence time at the operating temperature and pressure of 0.11 MPa was 2 seconds. The temperature of the effluent leaving the reactor was 1220° C.

The results of catalytic cracking of ammonia at 1220° C. in accordance with the invention and at 900° C. by way of comparison are shown in the Table below.

| | T 1220° C. | | T 900° C. | |
|---|---|---|---|---|
| Time | $NH_3$ % cracking | $H_2S$ % cracking | $NH_3$ % cracking | $H_2S$ % cracking |
| 10 min | 99.85 | 1% | 99.5 | 1% |
| 90 min | 99.85 | 1% | 50 | 1% |
| 5 hours | 99.85 | 1% | 0 | 1% |
| 2000 hours | 99.85 | 1% | | |

A comparison of the results shows that the catalyst continued to function entirely normally. It was thus not necessary to regenerate it in this variation.

The gaseous effluent obtained could be introduced into a Claus plant.

We claim:

1. A process for the selective catalytic cracking of ammonia present in a fluid consisting essentially of $NH_3$ or $NH_4OH$, and hydrogen sulphide, and optionally $H_2O$ and HCN, said process comprising introducing said fluid into a reaction zone heated to between 1000° C. and 1400° C. and comprising a selective cracking catalyst, and recovering a catalytic cracking effluent wherein the reaction zone is heated by electric heating or by indirect heat exchange means disposed inside said reaction zone, without the addition of chemical components for supplying heat required for cracking.

2. A process according to claim 1, in which the temperature of the reaction zone is 1150° C. to 1250° C.

3. A process according to claim 1, in which the pressure in the reaction zone is substantially that of the fluid entering it, and the injected flow rate of the fluid is such that the residence time in the catalytic reaction zone is in the range of 0.1 to 100 seconds.

4. A process according to claim 1, in which the fluid is a gas.

5. A process according to claim 1, in which the fluid contains $H_2O$ but not HCN.

6. A process according to claim 1, in which the fluid is at least one effluent selected from the group consisting of overhead effluents from the steaming apparatus for refinery process water, coal gasification effluents, coke-oven effluents and biogases.

7. A process according to claim 1, in which the catalyst is selected from the group consisting of at least one noble metal from group VIII, at least one metal from group VIIB, at least one metal from group VIIB mixed with at least one metal from group VIII, at least one metal from group VIII, at least one metal from group VIB, at least one non noble metal from group VIII mixed with at least one metal from group VIB and at least one non noble metal from group VIII with at least one noble metal from group VIII.

8. A process according to claim 1, using a reaction zone of ceramic material.

9. A process according to claim 1, in which the reaction zone comprises heating means disposed in substantially parallel layers determining transverse sections which are substantially perpendicular to the axis of said reaction zone, to define spaces or passages for the circulation of the feed or effluents between said means and/or layers formed by said means, the spaces which are in a range of temperature of at least 600° C., containing the catalyst.

10. A process according to claim 1, in which the reaction zone comprises at least one elementary reaction zone $Z_i$ in the direction of flow of the fluid, containing a fluid heating chamber followed by a chamber for catalysis of the heated fluid.

11. A process according to claim 10, in which the reaction zone comprises a plurality of elementary reaction zones $Z_i$, the temperature of the heating chamber of the downstream zone $Z_i$ being higher than that of the heating chamber of the upstream zone $Z_{i-1}$.

12. A process according to claim 1, in which at least one wall which is substantially parallel to the axis defines at least two channels in which said heating means defining spaces or passages are disposed.

13. A process according to claim 1, wherein the fluid contains HCN.

14. A process according to claim 1, wherein said fluid is the only fluid entering the reaction zone.

15. A process according to claim 5, wherein said fluid is the only fluid entering the reaction zone.

16. process according to claim 13, wherein said fluid is the only fluid entering the reaction zone.

17. A process according to claim 1, further comprising passing the resultant fluid containing $H_2S$ to a Claus plant.

18. A process for the selective catalytic cracking of ammonia present in a fluid consisting essentially of $NH_3$ or $NH_4H$, and hydrogen sulphide, and optionally $H_2O$ and HCN, said process comprising introducing said fluid into a reaction zone heated to between 1000° C. and 1400° C. and comprising a selective cracking catalyst, and recovering a catalytic cracking effluent, wherein the reaction zone is heated by electric heating or by indirect heat exchange means disposed inside said reaction zone, said fluid being the only fluid entering the reaction zone.

19. A process according to claim 18, further comprising passing the resultant fluid containing $H_2S$ to a Claus plant.

20. A process for the selective catalytic cracking of ammonia present in a fluid consisting essentially of $NH_3$ or $NH_4OH$, and hydrogen sulphide, and optionally $H_2O$ and HCN, said process comprising introducing said fluid into a reaction zone heated to between 1000° C. and 1400° C. and comprising a selective cracking catalyst, and recovering a catalytic cracking effluent, wherein said reaction zone is heated by means consisting essentially of electric heating or indirect heat exchange means disposed inside the reaction zone.

21. A process according to claim 20, further comprising passing the resultant fluid containing $H_2S$ to a Claus plant.

* * * * *